United States Patent

Morimoto et al.

[11] 4,318,312
[45] Mar. 9, 1982

[54] GEARSHIFT CONTROL SYSTEM FOR AUTOMATIC TRANSMISSIONS USING AIR FLOW SENSOR

[75] Inventors: Yoshiro Morimoto; Keizaburo Usui, both of Yokohama; Masanori Mizote, Yokosuka, all of Japan

[73] Assignee: Nissan Motor Co., Ltd., Yokohama, Japan

[21] Appl. No.: 49,342

[22] Filed: Jun. 18, 1979

[30] Foreign Application Priority Data

Jul. 31, 1978 [JP] Japan .................. 53-92639

[51] Int. Cl.³ .................. B60K 41/00; B60K 41/06
[52] U.S. Cl. .................. 74/866; 74/856; 74/861; 74/863; 74/864
[58] Field of Search .................. 74/866, 752 D, 856, 74/861, 862, 863, 864, DIG. 6

[56] References Cited

U.S. PATENT DOCUMENTS

| | | | |
|---|---|---|---|
| 2,127,589 | 8/1938 | Erban | 74/862 |
| 3,688,609 | 9/1972 | Friedline | 74/866 |
| 3,726,159 | 4/1973 | Mizote | 74/866 |
| 3,733,930 | 5/1973 | Mizote | 74/866 |
| 3,738,199 | 6/1973 | Kubo et al. | 74/869 |
| 3,741,042 | 6/1973 | Ravenel | 74/866 X |
| 3,759,344 | 9/1973 | Blee et al. | 74/866 X |
| 3,776,048 | 12/1973 | Enomoto et al. | 74/866 |
| 3,827,315 | 8/1974 | Lupo | 74/863 |
| 3,881,368 | 5/1975 | Furuhashi et al. | 74/752 D |
| 3,922,933 | 12/1975 | Sakai et al. | 74/866 |
| 3,938,409 | 2/1976 | Uozumi | 74/866 |
| 3,942,393 | 3/1976 | Forster | 74/862 X |
| 3,943,799 | 3/1976 | Sakai et al. | 74/866 |
| 4,023,442 | 5/1977 | Woods et al. | 74/863 |
| 4,106,367 | 8/1978 | Bouvet | 74/863 X |
| 4,126,061 | 11/1978 | Fry | 74/866 |
| 4,172,505 | 10/1979 | Rabus | 74/752 D X |
| 4,187,742 | 2/1980 | Archard | 74/863 |

FOREIGN PATENT DOCUMENTS

2748227 6/1978 Fed. Rep. of Germany ........ 74/863
53-11623 4/1978 Japan .

*Primary Examiner*—Leslie Braun
*Attorney, Agent, or Firm*—Thompson, Birch, Gauthier & Samuels

[57] ABSTRACT

A gear shift control system for an automatic transmission comprises an air flow sensor for sensing the quantity of air taken into an internal combustion engine and supplying a corresponding electrical signal to a differentiator which provides a derivative of the sensed intake air quantity. A vehicle speed sensor senses the speed of rotation of the engine crankshaft to generate a corresponding signal. A gear shift decision circuit is receptive of signals from the air flow sensor and vehicle speed sensor to define a gear shift control line on a two-dimensional coordinate system as a function of the received input signals on respective coordinate axes. The derivative of the sensed air quantity is used to shift the gear shift control line to a higher speed side of the coordinate system to permit the transmission to effect downshift operation.

11 Claims, 11 Drawing Figures

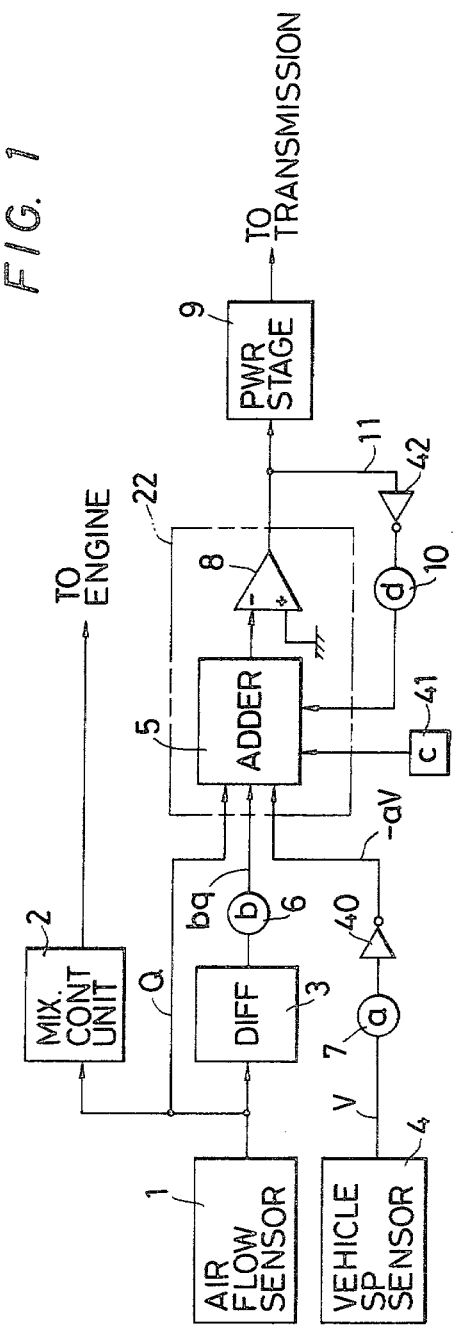
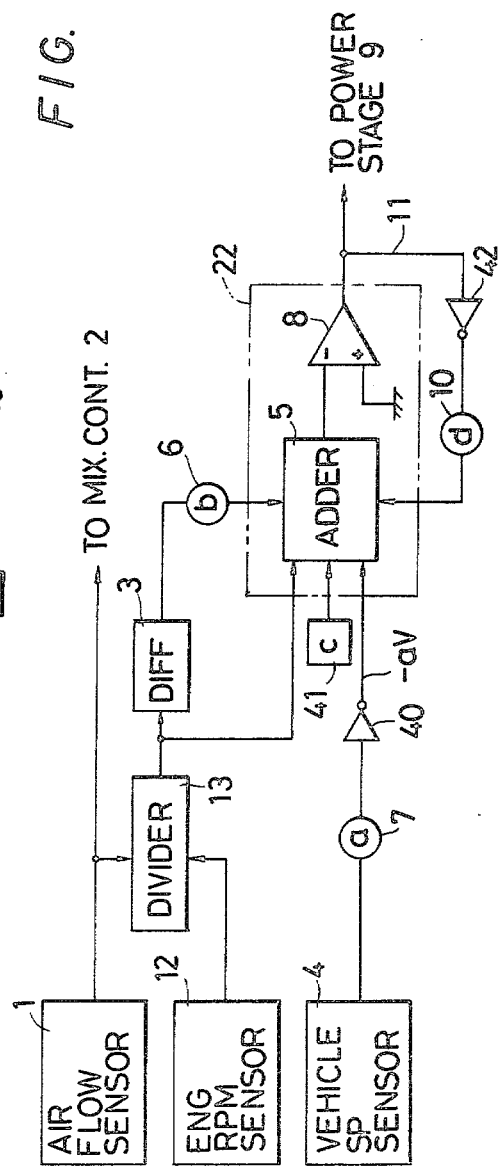

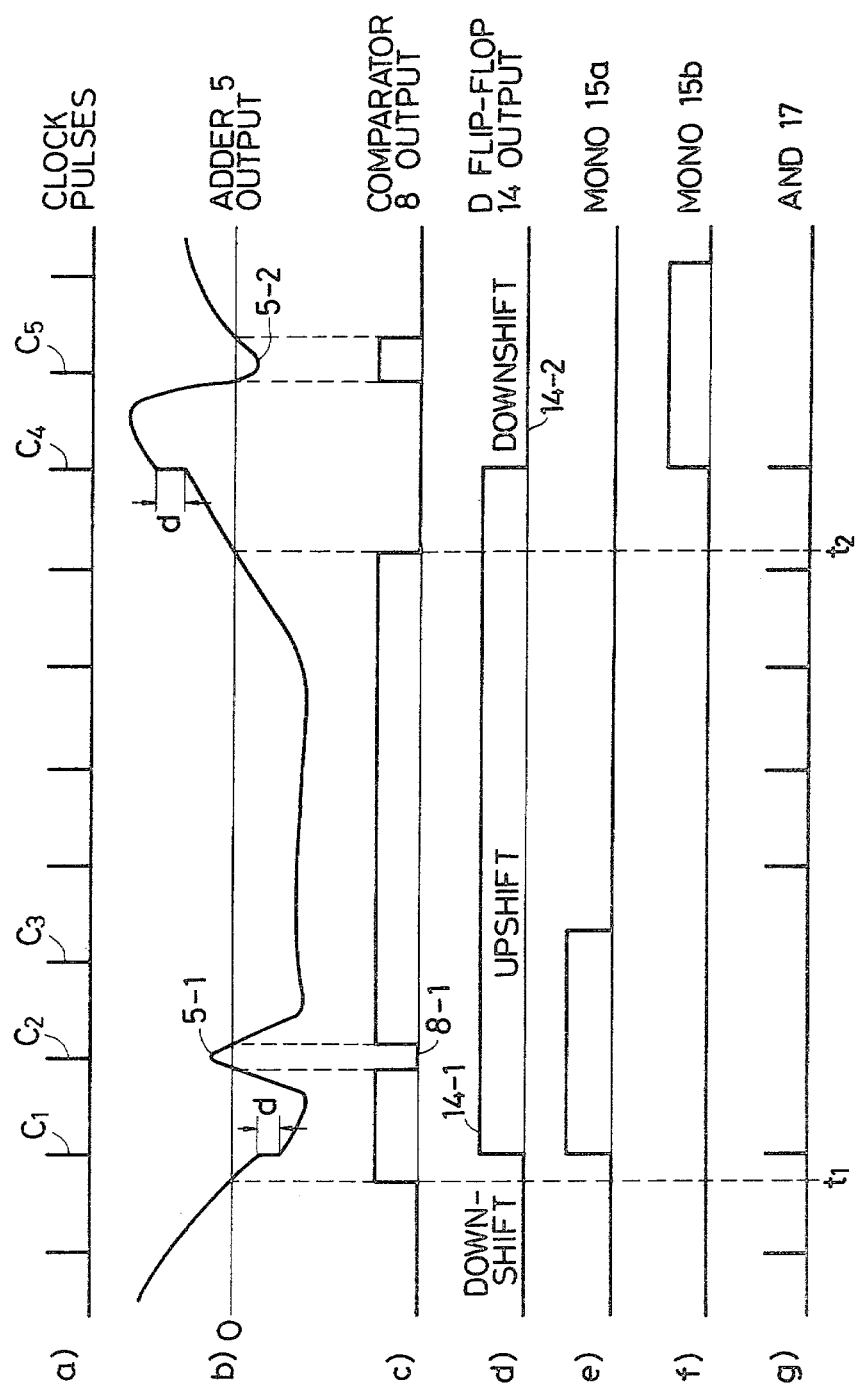

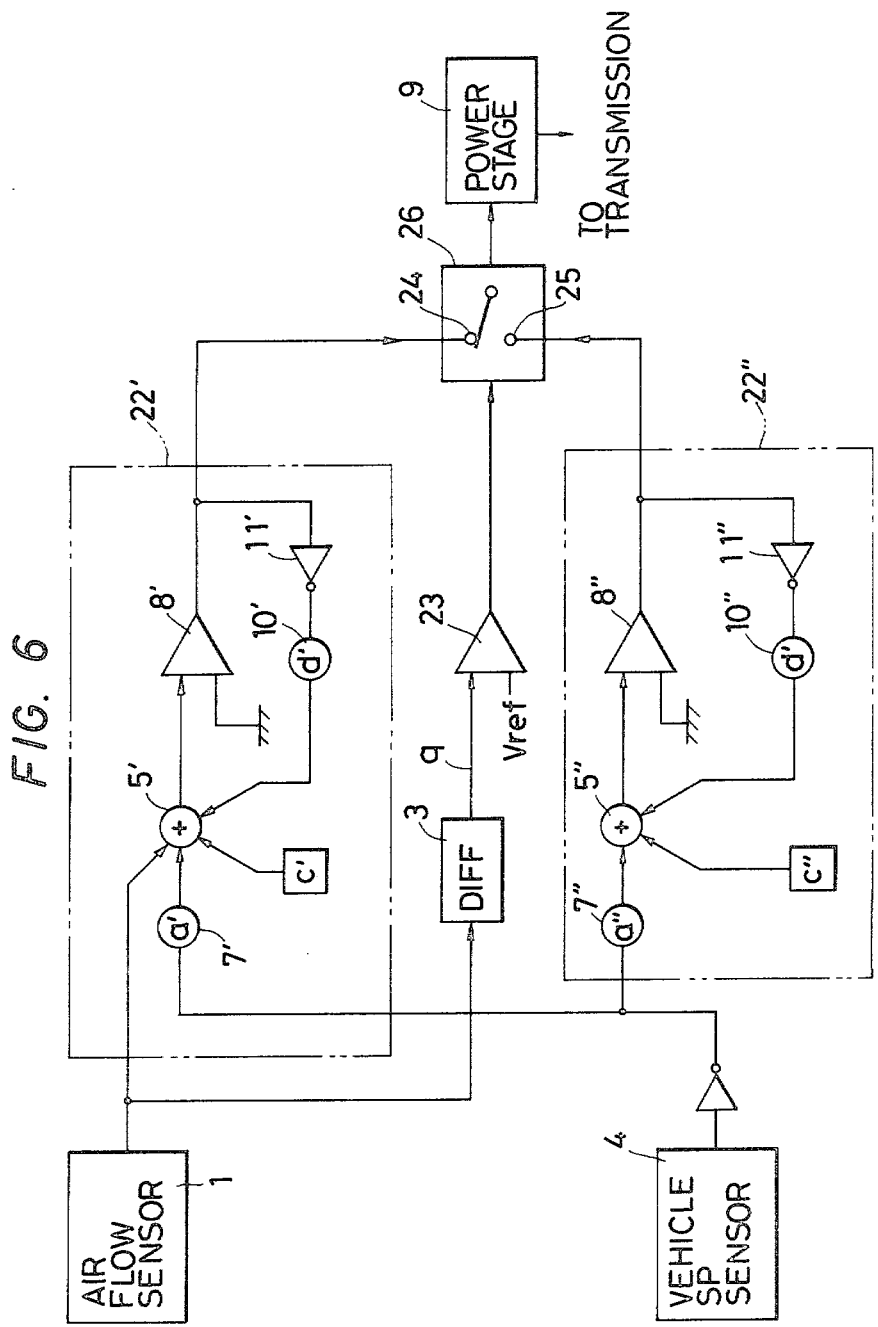

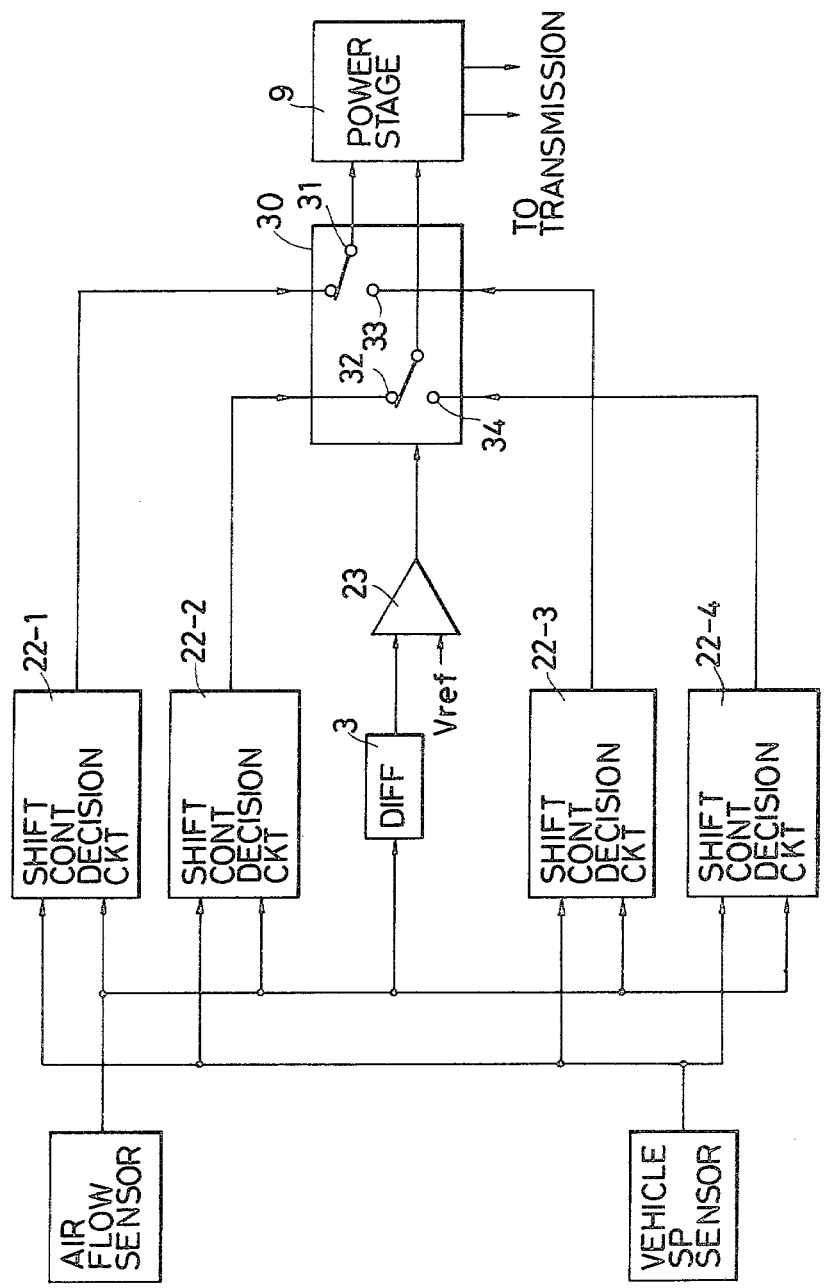

GEARSHIFT CONTROL SYSTEM FOR AUTOMATIC TRANSMISSIONS USING AIR FLOW SENSOR

BACKGROUND OF THE INVENTION

The present invention relates to gear shift control systems for automatic transmissions, and in particular to such a system wherein the rate of increase in air quantity taken into the engine is detected to effect downshift operation.

Conventional automatic transmissions for automotive vehicles are provided with gear shift control valves which operate on a balance between a speed-sensitive governor oil pressure and a throttle pressure to supply working fluids for application and release of various clutches and bands. For a given throttle opening, an increase in the governor oil pressure will automatically result in a reduction in gear ratio (upshift operation). A downshift valve is also provided to supply pressure to act against the governor oil pressure to change to a higher gear ratio (downshift operation) when the vehicle drive attempts to obtain a rapid acceleration. However, the downshift valve is so adjusted that it operates only when the throttle opening exceeds a predetermined value. Therefore, when the downshift valve operates the engine has developed a greater amount of torque than is required due to the wide open throttle, thus resulting in a greater amount of acceleration than the driver desires to obtain.

To overcome this problem prior attempts have involved the use of a detector for sensing the rate of increase in throttle opening or the rate of decrease in intake vacuum pressure as a controlling factor to effect downshift operation, as disclosed in Japanese Pat. No. 53-11623.

However, it is found that either the throttle opening or intake vacuum is not proportional to the engine torque over the full range of such operating parameters, so that an optimum amount of acceleration is difficult to achieve.

SUMMARY OF THE INVENTION

The present invention is based on the discovery that the quantity of air taken into the engine is proportional to the engine torque throughout its range.

The gear shift control system of the invention comprises an air flow sensor for sensing the quantity of air taken into the engine to generate a corresponding electrical signal and a differentiator coupled to the air flow sensor to generate a signal representative of the derivative of the sensed intake air quantity. For accurate representation of engine torque or load, an engine speed sensor is provided to generate a signal indicative of the speed of revolution of engine crankshaft. The signals from the air flow sensor and engine speed sensors are supplied to a divider circuit wherein the air quantity signal is divided by the engine speed signal to obtain a signal representing the intake air quantity per engine crankshaft revolution. The control system of the invention further comprises a gearshift decision circuit receptive of signals from the air flow sensor and the vehicle speed sensor to define a gearshift control line in a two-dimensional coordinate axes system as a function of the sensed air quantity on one co-ordinate axis and as a function of the sensed vehicle speed on the other coordinate axis. As the sensed parameters vary and cross the control line, a gearshift operation takes place. The output of the differentiator is used to shift the control line to the higher speed side of the coordinate system to permit the transmission to increase the gear reduction ratio to rapidly increase the engine torque.

An object of the present invention is therefore to provide a gearshift control system which assures rapid acceleration in exact proportion to the rate of increase in intake air quantity.

BRIEF DESCRIPTION OF THE DRAWINGS

The invention will be further described by way of example with reference to the accompanying drawings, in which:

FIG. 1 is a schematic diagram of an embodiment of the invention;

FIG. 2 is a schematic diagram of a modification of the FIG. 1 embodiment;

FIGS. 5a to 5g are illustrations of waveforms appearing at various points of the embodiment of FIG. 4;

FIG. 6 is a further modification of the embodiments of FIGS. 1 and 2;

FIG. 8 is a modification of the embodiment of FIG. 6; and

DETAILED DESCRIPTION

Figure 4:
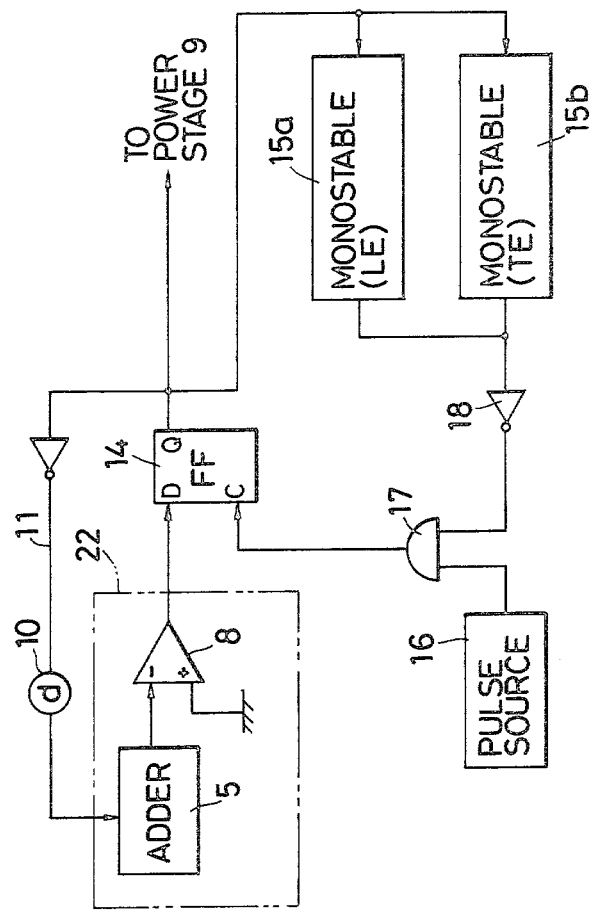
FIG. 4 is a schematic diagram of a further modification of the embodiments of FIGS. 1 and 2.

In FIG. 1, an air flow sensor 1 delivers a signal Q in proportion to a sensed air quantity taken into an internal combustion engine. A fuel supply control circuit 2 is supplied with the signal Q from the sensor 1, determines the fuel supply quantity to give a desired air-fuel ratio, and supplies mixture in the determined air-fuel ratio to the engine. A differentiator 3 is provided to receive the air quantity signal Q and generates a differentiated signal or derivative q of the sensed intake air quantity which is an accurate representation of engine torque. A rectifier or diode (not shown) is provided in the differentiator 3 to deliver a signal of one polarity which is generated in response to an increase in the air quantity. A vehicle speed sensor 4 is provided to sense the speed of revolution of engine crankshaft and generates a corresponding electrical signal V. This signal V is multiplied by a coefficient a by means of a multiplier or amplifier 7 and has its polarity inverted by an inverter 40 for application to an input of an adder 5 which also receives as its other signals the air quantity signal Q from the sensor 1 and a constant voltage signal c from a source 41. The derivative signal q is multiplied by a coefficient b by means of a multiplier 6 and applied to another input of the adder 5.

The output of the adder 5 is connected to an inverting input of a comparator 8 of which the non-inverting input is connected to ground to generate a logic "1" signal when the algebraic summation of the input signals to the adder 5 is negative and generate a logic "0"

when the summation results in a positive signal. Adder 5 and comparator 8 are part of a gearshift control 22.

To the output of the comparator 8 is coupled a negative feedback circuit 11 which includes an inverter 42 and a multiplier 10 with a coefficient d to negatively feedback a signal +d or a signal −d to an input of the adder 5 depending on the logic level of the comparator 8 output. When the output of the comparator 8 is at logic "1" level an upshift command signal is delivered to the transmission through a power stage 9 and a signal −d is fed back to the adder 5 so that the latter provides algebraic summation of signals Q−aV+bq+c−d. When the summation of these input signals becomes positive, the comparator 8 is switched to logic "0" output stage which is inverted by the inverter 42 and the multiplier 10 provides a signal +d to the adder 5. As a result, the adder 5 receives signals Q−aV+bq+c+d.

Assuming that there are no variations in the air quantity signal Q and hence no signal bq generated, the upshift point is determined by the signal Q−aV+c+d, and the downshift point is determined by the signal Q−aV+c−d. In this way, a hysteresis action is provided betwen the downshift and upshift points. This prevents the system from repeatedly shifting the gear ratios in reponse to insignificant variations of intake air quantity and of engine speed.

Figure 3:
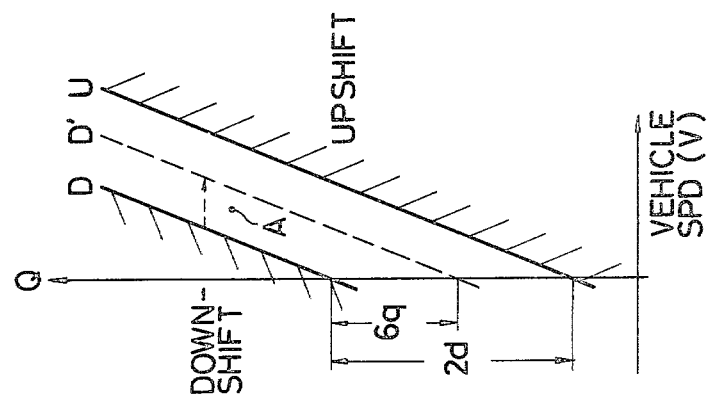
FIG. 3 is a graphic illustration of the sensed air quantity v.s. vehicle speed characteristics or gear shift control characteristics associated with the embodiment of FIG. 1.

FIG. 3 is an explanatory diagram of the gear shift operation of the embodiment of FIG. 1, wherein D and U indicate respectively the downshift line Q=aV−c+d and the upshift line Q−aV−c−d on the assumption that there are no variations in the intake air quantity Q. The right side of the respective lines signifies a higher vehicle speed range and the left side indicates a lower speed range. Assuming that the vehicle is running on a level road at a constant speed, that is, the vehicle load is constant as indicated by a point A, the transmission is now at a higher speed gear ratio. If it is assumed that the intake air quantity is rapidly increased to increase the torque of the engine for acceleration, a voltage signal bq is generated, so that the downshift line D is shifted to D′ and the point A is thus positioned to the left of the line D′ thereby effecting a downshift operation. Accordingly, when the accelerator pedal is depressed to obtain the necessary acceleration, the downshift line D is moved to a higher speed ratio in response to a quantity bq. The rate of increase in intake air quantity is thus taken into account in order to effect a downshift operation prior to the time when the engine torque has increased to a level greater than is appropriate. Therefore, the vehicle obtains a desired amount of acceleration.

In the foregoing description, the measured value of the intake air quantity Q is used as a representation of the amount of engine torque. Air quantity which is taken in for each revolution of engine crankshaft can also be used to represent the engine load. This is obtained by arithmetically dividing the measured value of the intake air quantity Q by the magnitude of a signal N indicative of the engine speed. The relation between the intake air quantity per crankshaft revolution (Q/N) and the output torque of the engine is linearly proportional over a wide range as in the case of the relation between the intake air quantity Q and the torque. Thus, the amount of change $\Delta T_1$ in engine torque T for a given amount of change $\Delta Q/N$ at low values of Q/N equals the amount of change $\Delta T_2$ in engine torque at higher values of Q/N.

FIG. 2 shows another embodiment of the invention in which the intake air quantity per engine crankshaft revolution (Q/N) is employed as a load representing parameter. The same components as used in the FIG. 1 embodiment are indicated by the same reference numerals. The gearshift control 22 is comprised by adder 5 and comparator 8 as in the previous embodiment. The air flow sensor 1 detects the quantity of intake air and feeds signal Q to an arithmetic divider 13 which receives another input signal representing engine speed from an engine speed sensor 12. The divider 13 divides the measured intake air quantity by the engine revolution to obtain a signal Q/N and feeds it to the differentiator 3 and also to the adder 5. An output q/N from the differentiator 3 is multiplied in multiplier 6 by a coefficient b to provide a signal b(q/N) and fed into the adder 5. The adder 5 adds up the signals b(q/N), the voltage signal c, and the signals aV and d, the polarity of the latter signal being determined by the comparator 8 output. Thus, when the transmission is in a lower speed ratio, signals Q/N−aV+b(q/N)+c+d are fed into the adder 5. When the summation of the adder 5 results in a negative value, the comparator 8 delivers a logic 1 to the power stage 9 to effect an upshift operation to change the gear ratio to a higher speed side. Conversely, when the transmission is in a higher gear ratio, signals Q/N−aV+b(q/N)+c−d are fed to the adder 5 and if the adder provides a positive signal, the comparator 8 delivers a logic "0" to effect downshift operation.

The embodiment of FIG. 2 provides the following advantage. Assuming that when the driver desires an increase in engine torque for acceleration, the throttle opening is increased for a period $\Delta t$. The intake air quantity Q increases to $Q+\Delta Q$ and the number of N of engine revolutions increases to $N+\Delta N$, thus the rate of change $\Delta(Q/N)$ is represented by the following equation:

$$\frac{1}{\Delta t}\left(\frac{Q+\Delta Q}{N+\Delta N}-\frac{Q}{N}\right)=\frac{\Delta Q-Q\frac{\Delta N}{N}}{N+\Delta t\cdot\Delta N}$$

Since N is much greater than $\Delta t \cdot \Delta N$, $\Delta(Q/N)$ roughly equals to $$\left(\Delta Q-Q\frac{\Delta N}{N}\right)/N.$$

Since the value $Q(\Delta N/N)$ represents the amount of change in air quantity as a function of engine speed, the above equation is a more accurate representation of engine torque than $\Delta Q/\Delta t$ which is used in the FIG. 1 embodiment.

Gearshift operation is effected as in the conventional torque converter by the operation of the brake of the planetary gear train and the clutch. Since the engine load varies in response to a gear shift, a transitional variation occurs in the engine crankshaft revolution in response to the occurrence of a change in gear ratio. It is thus likely that the system erroneously recognizes such transient engine speed variation as an indication of an engine load variation. More specifically, the output of the air flow sensor 1 will vary rapidly as a consequence of an upshift operation and the system tends to recognize it as an indication of an increase in engine load and then proceeds to effect a downshift operation, or conversely the system senses the occurrence of a transient load increase in response to a downshift operation as an indication of a load decrease and erroneously effects an upshift operation. Such erroneous gearshift operations are likely to occur more frequently when the engine load parameter is represented by the quantity of intake air Q than when the Q/N value is used.

An embodiment shown in FIG. 4 is so constructed as to prevent the above-mentioned disadvantages that occur in response to an upshift or downshift operation, wherein the intake air quantity per engine revolution Q/N is used as in the embodiment of FIG. 2 to represent the engine load parameter, rather than the intake air quantity value Q. The gearshift control or operation of the decision circuit 22 being the same as the FIG. 2 embodiment, the description thereof is omitted. In FIG. 4, a D flip-flop 14 is provided having its data input D connected to the output of the decision circuit 22 and having its clock input C connected to the output of an AND gate 17. One input terminal of AND gate 17 is connected to a pulse source 16 which generates a train of clock pulses at regular intervals and another input terminal is connected to a pair of monostable multivibrators 15a and 15b through an inverter 18. Monostable multivibrator 15a generates an output pulse of a predetermined duration in response to the leading edge of an input pulse supplied from the Q output of flip-flop 14 and monostable multivibrator 15b generates an output pulse in response to the trailing edge of that pulse. In the absence of the output pulses from the monostable 15a multivibrators and 15b, a high level output is delivered from the inverter 18 to the AND gate 17 to enable it to pass clock pulses to the clock terminal of the flip-flop 14. The Q output of the flip-flop changes its binary state to the binary state of the data input terminal D in response to the application of a clock pulse.

The operation of the circuit of FIG. 4 is visualized by reference to waveforms shown in FIGS. 5a to 5g. FIG. 5a shows a train of clock pulses supplied from the clock pulse source 16, and FIG. 5b shows the waveform of an output signal from the adder 5. It is assumed that the transmission is initially at a downshift position, producing a positive output signal from the adder 5 as shown in FIG. 5b. At time t₁ the adder 5 changes to a negative value when the engine load reduces below a predetermined level, the comparator 8 goes into a high voltage state (FIG. 5c). Since the AND gate 17 has been enabled by the high level output of inverter 18, the flip-flop 14 responds to a clock pulse C1 by changing the binary state of its Q output to the binary state of its D input which is now at high level as shown in FIG. 5c, thereby producing an upshift command signal 14-1 (FIG. 5d). Responsive to the leading edge of the upshift command signal, the monostable multivibrator 15a is triggered to produce a pulse (FIG. 5e) having a sufficient period of time to cover a possible transient phenomenon. If the apparent engine load is momentarily increased as a result of the upshift operation, causing the adder 5 to generate a positive signal 5-1 (FIG. 5b) which in turn results in a low level output 8-1 from the comparator 8 (FIG. 5c), and if a clock pulse C2 is applied to the flip-flop 14, an upshift command signal would erroneously result. To prevent this erroneous upshift operation, the monostable 15a supplies an inhibit pulse (FIG. 5e) through inverter 18 in response to the leading edge of the upshift signal at time t₁. This inhibit pulse has a duration sufficient to mask the signal 5-1 representing the false engine load increase. During this inhibit period clock pulses C2 and C3 are interrupted so that the output of the flip-flop 14 remains unchanged and thus the transmission is unaffected by the transient increase in engine load. In a similar manner, the transmission is free from a transient decrease in engine load which occurs in response to a downshift operation. In this case the engine load is assumed to increase so that the adder 5 output changes its polarity from negative to positive at time t₂, resulting in a low voltage at the output of comparator 8 which in turn enables the AND gate 17. A clock pulse C4 is passed to the flip-flop 14 to change its Q output state to the low state of its D input, producing a downshift command signal 14-2. In response to the trailing edge of the upshift command signal 14-1, that is, the leading edge of the downshift command signal 14-2, the monostable 15b generates an inhibit pulse (FIG. 5f) through inverter 18 to prevent the passage of a clock pulse C5 which occurs in coincidence with a negative signal 5-2 from the adder 5 representing a transitional decrease in engine load. Thus, the flip-flop 14 is prevented from being triggered falsely in response to clock pulse C5 and its Q output remains unchanged regardless of the presence of a high voltage state provided by a pulse 8-2.

Figure 7A:
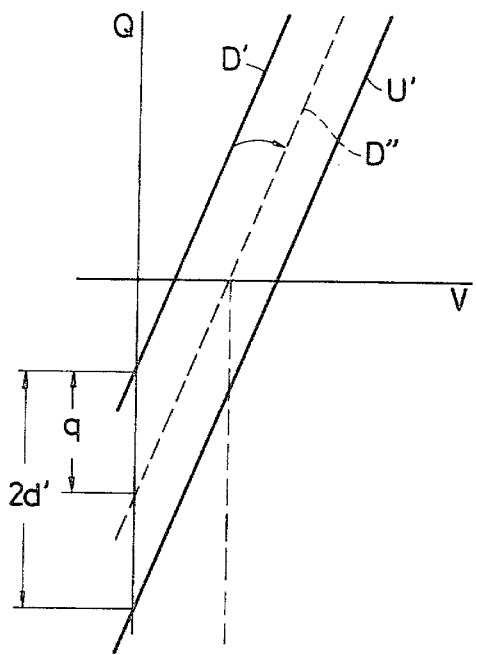
FIGS. 7a and 7b are graphic illustrations of gear shift control characteristics associated with the embodiment of FIG. 6.
Figure 7B:
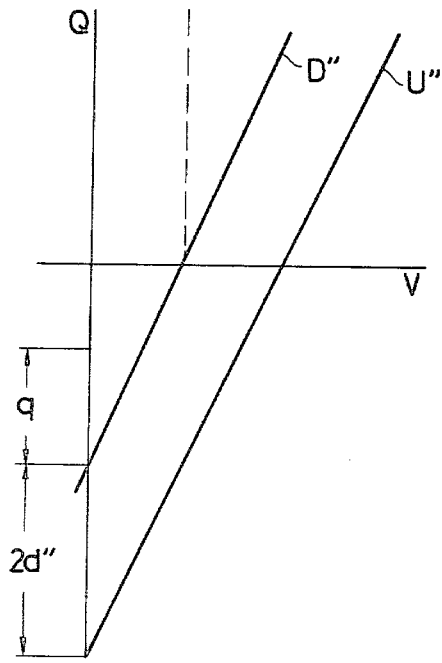

A modification of the embodiments of FIGS. 1 and 2 is illustrated in FIG. 6 in which two shift control decision circuits 22' and 22" are employed. Each of the circuits 22' and 22" comprises substantially the same as the decision circuit 22 of the previous embodiments with the exception that the differentiator 3 and multiplier 6 are excluded. These decision circuits differ from each other by inclusion of different constant multiplication factors a, c and d to provide different downshift and upshift control lines D, U, D' and U' as shown in FIGS. 7a and 7b. The differentiator 3 is connected to the air flow sensor 1 to provide a derivative q of the intake air quantity Q to a comparator 23 wherein it is compared with a reference voltage Vref to generate a switching control signal when the q value exceeds the reference voltage. The gear shift command signals from the control circuits 22' and 22" are coupled respectively to contacts 24 and 25 of a switch 26. In the absence of a control signal from the comparator 23, the switch 26 remains connected to the terminal 24 to couple the signal from control circuit 22' to power stage 9 and thence to transmission, and, in response to the presence of the control signal, the signal from the circuit 22" is coupled instead to the transmission.

As shown in FIG. 7a, the decision circuit 22' provides downshift and upshift control lines D' and U' for lower vehicle speeds with a hysteresis gap 2d' between them. In response to a driver's command indicating a rapid acceleration, causing an increase in voltage to occur at the air flow sensor 1 output, the derivative of the air quantity is detected by the differentiator 3. If this derivative exceeds the reference voltage of the comparator 23, the latter provides a control signal to the switch 26 to deliver the output of the decision circuit 22" to the transmission. The latter circuit 22" is designed to provide downshift and upshift lines D" and U" for higher vehicle speeds with a hysteresis gap 2d" therebetween as shown in FIG. 7b. Downshift control line D" lies between lines D' and U' as shown in broken lines in FIG. 7a and upshift line U" lies to the right of upshift line U'. The downshift line is thus shifted to the right of the line D' as in the previous embodiments, and as a consequence the transmission effects downshift gear change operation prior to the time the vehicle has developed an excessive amount of acceleration.

Figure 9A:
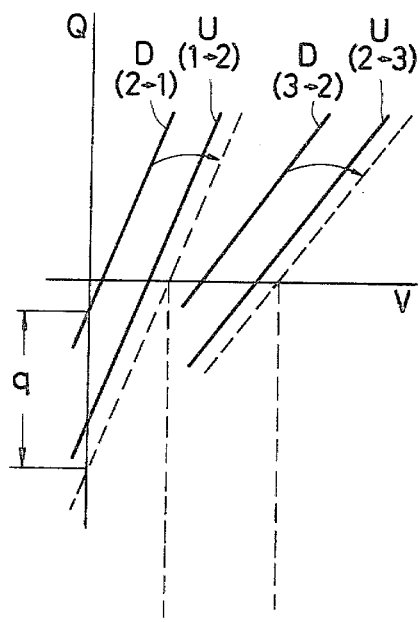
FIGS. 9a and 9b are graphic illustrations of gear shift control characteristics associated with the embodiment of FIG. 8.
Figure 9B:
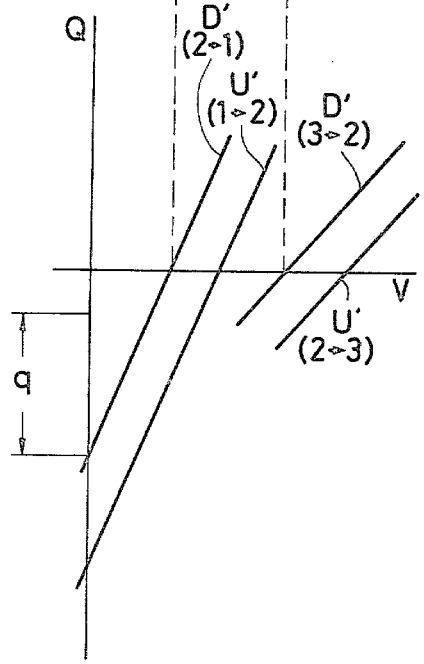

The embodiment of FIG. 6 is modified as shown in FIG. 8 which effects three speed gear changes. The FIG. 8 embodiment comprises a first set of shift control decision circuit 22-1 and 22-2 which define gearshift control lines for lower vehicle speeds and a second set of shift control decision circuits 22-3 and 22-4 which define gearshift control lines for higher vehicle speeds. Each of these gearshift decision circuits is essentially of the same construction as the circuits 22 of FIG. 6; the circuit 22-1 being designed to provide a downshift control line D from second to first speed and an upshift control line U for effecting a gear change from first speed to second speed; the circuit 22-2 providing a downshift line D for effecting a gear change from third speed to second speed and an upshift line U for effecting a gear change from second speed to third speed as shown in FIG. 9a. In a similar manner, the circuit 22-3 provides a downshift line D' for effecting gear change from second to first speeds and an upshift line U' for effecting a gear change from first to second speeds, circuit 22-4 providing a downshift line D' for third-to-second speed gear change and an upshift line for second-to-third speed gear change, as shown in FIG. 9b. The downshift lines D'(2 to 1) and D'(3 to 2) lie to the right of the lines D(2 to 1) and D(3 to 2), respectively.

Output signals from the decision circuits 22-1 and 22-2 are coupled to terminals 31 and 32 of a switch 30 and output signals from the decision circuits 22-3 and 22-4 coupled to terminals 33 and 34 of the switch 30. As in the embodiment of FIG. 6, the differentiator 3 and comparator 23 provide a switching control signal to the switch 30. In the absence of the switching control signal the output signals from the circuits 22-1 and 22-2 are applied through power stage to the transmission and in the presence of the control signal, signals from circuits 22-3 and 22-4 are coupled instead to the transmission. In response to a driver's command to obtain a rapid acceleration, the comparator 23 provides a switching control signal to change the downshift point from lines D(2 to 1) and D(3 to 2) to D'(2 to 1) and D'(3 to 2), respectively, along with the upshift lines being changed from U to U'.

What is claimed is:

1. A gearshift control system for an automatic transmission of an automotive vehicle having an internal combustion engine, said system comprising:
   an air flow sensor for sensing the quantity of air taken into the internal combustion engine of said vehicle and for generating a first electrical signal representative of intake air quantity;
   a vehicle speed sensor for sensing the speed of said vehicle and generating a second electrical signal representative of vehicle speed;
   command signal generating means receptive of said first and second signals from said air flow and vehicle speed sensors for defining a transmission gear change control line between downshift and upshift areas in a two-dimensional coordinate axes system, the sensed intake air quantity being one coordinate axis and the sensed vehicle speed being the other coordinate axis, said command signal generating means being operative to selectively generate downshift and upshift command signals depending on the position of a variable point determined by the sensed intake air quantity and vehicle speed with respect to said gear change control line in said coordinate axes system; and
   a differentiator receptive of said first signal from said air flow sensor for generating a signal which is a derivative of the sensed intake air quantity, said derivative signal operative to shift said control line.

2. A gearshift control system as claimed in claim 1, further comprising an engine speed sensor and a divider circuit, said engine speed sensor sensing the speed of revolution of the engine crankshaft and generating a third electrical signal corresponding thereto, said divider circuit having a first input receptive of said first signal from said air flow sensor and a second input receptive of said third signal from said engine speed sensor for generating a fourth signal representative of the sensed air quantity taken into said engine per revolution of said engine crankshaft, and wherein said differentiator takes its input from said divider circuit, said differentiator generating a signal which is a derivative of the sensed intake air quantity per engine crankshaft revolution.

3. A gearshift control system as claimed in claim 1, wherein said command signal generating means includes means for shifting said control line by a predetermined amount in a direction opposite to the direction of movement of said variable point when it crosses said control line in response to variations of said sensed intake air quantity and vehicle speed.

4. A gearshift control system as claimed in claim 1, 2 or 3, wherein said command signal generating means includes an adder and a comparator, said adder providing a fifth signal defining an algebraic summation of said first and second signals from said air flow and vehicle speed sensors and said derivative signal from said differentiator, said comparator comparing said fifth signal from said adder with a reference value and generating a gearshift command signal when said fifth signal from said adder reaches said reference value.

5. A gearshift control system as claimed in claim 4, wherein said control line shifting means includes a negative feedback circuit for feeding an output signal from said comparator to said adder.

6. A gearshift control system as claimed in claim 1, further comprising a D flip-flop having a data input terminal, a clock input terminal and an output terminal, said data input terminal receptive of said upshift and downshift command signals from said command signal generating means, a source of clock pulses for supplying clock pulses to said clock input terminal of said flip-flop, and means for interrupting the supply of said clock pulses for a predetermined duration in response to a signal from said flip-flop, a signal at said output terminal of said flip-flop being modified upshift and downshift command signals.

7. A gearshift control system as claimed in claim 6, wherein said interrupting means comprises a coincident gate having one input receptive of said clock pulses, an inverter, a first monostable multivibrator taking its input from said output terminal of said flip-flop to generate a first pulse in response to said modified downshift command signal from said flip-flop, and a second monostable multivibrator taking its input from said output terminal of said flip-flop to generate a second pulse in response to said modified upshift command signal from said flip-flop, the output signals of said monostable multivibrators being connected to another input of said coincident gate through said inverter.

8. A gearshift control system as claimed in claim 1, 2 or 3 wherein said command signal generating means includes:
- a first decision circuit having means for defining a first transmission gear change control line between downshift and upshift areas in a two-dimensional coordinate axes system as a function of the sensed intake air quantity on one coordinate axis and as a function of the sensed vehicle speed on the other coordinte axis, said first decision circuit operative to selectively generate first downshift and first upshift command signals depending on the position of a variable point determined by the sensed intake air quantity and vehicle speed with respect to said first gear change control line;
- a second decision circuit having means for defining a second transmission gear change control line between downshift and upshift areas in a two-dimensional coordinate axes system as a function of the sensed intake air quantity on one coordinate axis and as a function of the sensed vehicle speed on the other coordinate axis, said second decision circuit operative to generate second downshift and second upshift command signals depending on the position of said variable point with respect to said second gear change control line;
- value sensing means for generating a value signal when said derivative exceeds a predetermined value; and
- means responsive to said value signal from said value sensing means for selectively coupling one of said first and second downshift command signals to said transmission.

9. A gearshift control system as claimed in claim 8, wherein each of said first and second decision circuits includes an adder for providing a fifth signal defining an algebraic summation of said first and second signals from said air flow sensor and vehicle speed sensor and wherein said value sensing means is a comparator for comparing said fifth signal from said adder with a reference value to selectively generate downshift and upshift command signals when said fifth signal from said adder varies by a predetermined amount from said reference value.

10. A gearshift control system as claimed in claim 9, further comprising a negative feedback circuit for coupling said value signal from said comparator to said adder.

11. A gearshift control system as claimed in claim 1, further comprising means for shifting said control line to a higher speed side of said coordinate axes system in accordance with said derivative signal.

* * * * *